United States Patent
Pan et al.

(10) Patent No.: US 12,126,033 B2
(45) Date of Patent: Oct. 22, 2024

(54) BATTERY MANUFACTURING METHOD AND BATTERY

(71) Applicant: CALB CO., LTD., Changzhou (CN)

(72) Inventors: Fangfang Pan, Changzhou (CN); Jiuling Xu, Changzhou (CN); Binwei Qi, Luoyang (CN); Yongjie Zhang, Luoyang (CN)

(73) Assignee: CALB Co., Ltd., Jiangsu (CN)

( * ) Notice: Subject to any disclaimer, the term of this patent is extended or adjusted under 35 U.S.C. 154(b) by 0 days.

(21) Appl. No.: 17/383,356

(22) Filed: Jul. 22, 2021

(65) Prior Publication Data

US 2022/0367950 A1     Nov. 17, 2022

(30) Foreign Application Priority Data

May 14, 2021 (CN) .......................... 202110526792.6

(51) Int. Cl.
*H01M 50/169* (2021.01)
*B23K 26/38* (2014.01)
*H01M 10/04* (2006.01)

(52) U.S. Cl.
CPC ........... *H01M 50/169* (2021.01); *B23K 26/38* (2013.01); *H01M 10/04* (2013.01)

(58) Field of Classification Search
CPC ... H01M 10/04; H01M 10/0436–0463; H01M 10/05; H01M 10/058–0587; H01M 50/10–105; H01M 50/147–153; H01M 50/166–171
See application file for complete search history.

(56) References Cited

U.S. PATENT DOCUMENTS

| | | | |
|---|---|---|---|
| 5,411,616 A | 5/1995 | Desai et al. | |
| 6,451,476 B1 * | 9/2002 | Chang ............... | H01M 10/0436 429/127 |

(Continued)

FOREIGN PATENT DOCUMENTS

| | | |
|---|---|---|
| CN | 201877526 | 6/2011 |
| CN | 207558835 | 6/2018 |

(Continued)

OTHER PUBLICATIONS

"Search Report of Europe Counterpart Application", issued on Jan. 21, 2022, pp. 1-8.

(Continued)

*Primary Examiner* — Jonathan Crepeau
*Assistant Examiner* — Jacob Buchanan
(74) *Attorney, Agent, or Firm* — JCIP GLOBAL INC.

(57) ABSTRACT

A battery manufacturing method and a battery are provided. The battery manufacturing method includes: providing a first housing, including a bottom wall and a side wall, wherein the side wall extends upward from the bottom wall, the side wall encloses to form an opening, the side wall extends outward from the opening to form a first flange, and a first reinforcing part is formed on the first flange; providing a second housing, wherein the second housing includes an intermediate part and a second flange, the intermediate part covers the opening, and the second flange is in contact with the first flange; and welding the first flange and the second flange.

15 Claims, 6 Drawing Sheets

(56) References Cited

U.S. PATENT DOCUMENTS

| | | | | |
|---|---|---|---|---|
| 2006/0093905 A1* | 5/2006 | Kim | ................... | H01M 50/116 |
| | | | | 429/175 |
| 2011/0244315 A1* | 10/2011 | Yoon | ................... | H01M 50/60 |
| | | | | 156/146 |
| 2016/0294014 A1* | 10/2016 | Shirai | ............... | H01M 10/0585 |

FOREIGN PATENT DOCUMENTS

| | | |
|---|---|---|
| CN | 210897345 | 6/2020 |
| CN | 11564576 | 8/2020 |
| DE | 102012018038 | 3/2014 |
| GB | 935337 | 8/1963 |

OTHER PUBLICATIONS

Office Action of China Counterpart Application, with English translation thereof, issued on Jun. 29, 2023, pp. 1-10.

\* cited by examiner

BATTERY MANUFACTURING METHOD AND BATTERY

CROSS-REFERENCE TO RELATED APPLICATION

This application claims the priority benefit of China application serial no. 202110526792.6, filed on May 14, 2021. The entirety of the above-mentioned patent application is hereby incorporated by reference herein and made a part of this specification.

BACKGROUND

Technical Field

The disclosure relates to the field of battery technology, and in particular to a battery manufacturing method and a battery.

Description of Related Art

The battery in the related art includes a cell and a housing component. After completing the assembly of the cell, the assembly of the housing component needs to be implemented, that is, the assembly of a battery housing and a cover plate is implemented. Due to the structural limitations of the battery housing and the cover plate, the issue of deformation is prone to occur during the assembly process.

SUMMARY

According to a first aspect of the disclosure, a battery manufacturing method is provided, which includes the following.

A first housing is provided. The first housing includes a bottom wall and a side wall. The side wall extends upward from the bottom wall. The side wall encloses to form an opening. The side wall extends outward from the opening to form a first flange. A first reinforcing part is formed on the first flange.

A second housing is provided. The second housing includes an intermediate part and a second flange. The intermediate part covers the opening. The second flange is in contact with the first flange.

The first flange and the second flange are welded.

According to a second aspect of the disclosure, a battery is provided, which includes a battery obtained by the battery manufacturing method.

The battery according to the embodiment of the disclosure includes a first housing and a second housing. A first reinforcing part is formed on the first flange of the first housing.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DETAILED DESCRIPTION OF DISCLOSED EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

The disclosure provides a battery manufacturing method and a battery to improve a battery structure.

Figure 1:
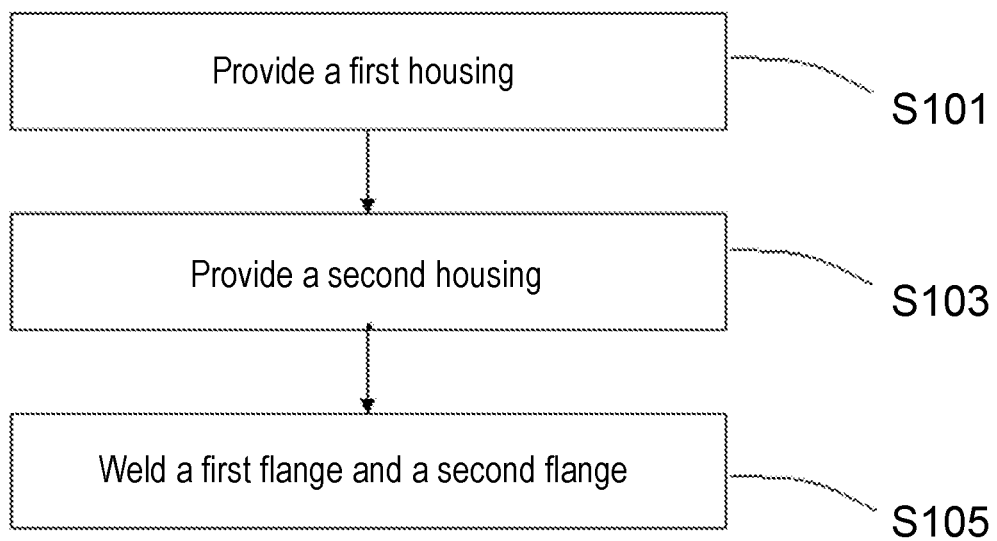
FIG. 1 is a schematic flowchart of a battery manufacturing method according to an exemplary embodiment.

An embodiment of the disclosure provides a battery manufacturing method. Please refer to FIG. 1. The battery manufacturing method includes the following.

In Step S101, a first housing 10 is provided. The first housing 10 includes a bottom wall and a side wall. The side wall extends upward from the bottom wall. The side wall encloses to form an opening. The side wall extends outward from the opening to form a first flange 11. A first reinforcing part 111 is formed on the first flange 11.

In Step S103, a second housing 20 is provided. The second housing 20 includes an intermediate part and a second flange 21. The intermediate part covers the opening. The second flange 21 is in contact with the first flange 11.

In Step S105, the first flange 11 and the second flange 21 are welded.

In the battery manufacturing method according to an embodiment of the disclosure, the first reinforcing part 111 is formed on the first flange 11 of the first housing 10, thereby avoiding the issue of deformation of the first housing 10 when welding the first flange 11 and the second flange 21, so as to improve a battery structure.

It should be noted that the first housing 10 includes the bottom wall and the side wall. The side wall extends upward from the bottom wall. The side wall encloses to form an opening, that is, the first housing 10 forms an accommodating cavity 40 and the opening is an opening of the accommodating cavity 40. The first flange 11 is formed in a circumferential direction of the opening of the accommodating cavity 40. The first flange 11 is a circumferentially closed structure.

The second housing 20 includes the intermediate part and the second flange 21, that is, the intermediate part may be a plate structure. The second flange 21 is disposed around a circumferential direction of the intermediate part. The second flange 21 is a circumferentially closed structure. In some embodiments, it is not excluded that the intermediate part is formed with a recess, that is, similar to the accommodating cavity 40. At this time, the depth of the accommodating cavity 40 of the second housing 20 may be less than the depth of the accommodating cavity 40 of the first housing 10.

In an embodiment, the second housing 20 includes the second flange 21. A second reinforcing part 211 is formed on the second flange 21, that is, the second reinforcing part 211 may implement the function of reinforcing the second housing 20, thereby avoiding the issue of deformation of the first flange 11 and the second flange 21 when welding the first flange 11 and the second flange 21.

It should be noted that the first flange 11 of the first housing 10 and the second flange 21 of the second housing 20 are oppositely disposed. The first flange 11 and the second flange 21 do not form an accommodating space of a battery.

The first flange 11 and the second flange 21 may be configured to connect the first housing 10 and the second housing 20, that is, the connection between the first housing 10 and the second housing 20 is implemented through welding the first flange 11 and the second flange 21.

Optionally, based on the welding of the first flange 11 and the second flange 21, a first main body part 12 of the first housing 10 and a second main body part 22 of the second housing 20 may be welded. For example, one of the first main body part 12 and the second main body part 22 is a plate, which also facilitates the welding of the first main body part 12 and the second main body part 22. The first flange 11 may be disposed around an outer circumferential edge of the first main body part 12, and the second flange 21 may be disposed around an outer circumferential edge of the second main body part 22, that is, the first flange 11 and the second flange 21 may be a circumferentially closed structure. The first main body part 12 includes the bottom wall and the side wall. The second main body part 22 includes the intermediate part.

It should be noted that the first housing 10 and the second housing 20 are provided regardless of the sequence.

In an embodiment, the battery manufacturing method further includes: cutting at least part of the first flange 11 after welding the first flange 11 and the second flange 21 to remove at least part of the first reinforcing part 111. The first reinforcing part 111 is configured to mainly serve the function of reinforcement when welding, so the first reinforcing part 111 may be removed after completing the welding, thereby reducing the length of the first flange 11, so as to reduce a circumferential occupied area of the battery.

Correspondingly, when the second housing 20 includes the second flange 21 and the second reinforcing part 211 is formed on the second flange 21, at least part of the second flange 21 is cut to remove at least part of the second reinforcing part 211.

It should be noted that the cutting of the first flange 11 and the second flange 21 may be completed through one cutting process, that is, the cutting of the second flange 2 may be completed when cutting the first flange 11. A laser cutting process may be adopted to cut the first flange 11 and the second flange 21. Of course, in some embodiments, it is not excluded to respectively cut the first flange 11 and the second flange 21 through two processes.

Optionally, when implementing the welding of the first housing 10 and the second housing 20 through the first flange 11 and the second flange 21, a part of the first flange 11 and the second flange 21 is cut, that is, a specific length of the first flange 11 and the second flange 21 is reserved.

Optionally, when implementing the welding of the first housing 10 and the second housing 20 through the first main body part 12 and the second main body part 22, the first flange 11 and the second flange 21 may be completely cut. Alternatively, a part of the first flange 11 and the second flange 21 is cut, that is, a specific length of the first flange 11 and the second flange 21 is reserved. At this time, the reserved first flange 11 and second flange 21 may be used as a heat dissipation fin. Of course, the reserved first flange 11 and second flange 21 may also be used as a subsequent installation and positioning component, which is not limited here.

In an embodiment, the first flange 11 and the second flange 21 are welded to form a welding seam 30. The welding seam 30 does not overlap with at least part of the first reinforcing part 111, thereby ensuring the welding quality. Also, the welding seam 30 will not be excessively cut off when subsequently cutting off the first reinforcing part 111. The welding seam 30 is a circumferentially closed structure, thereby ensuring the reliability of the connection between the first housing 10 and the second housing 20 and ensuring that a relatively closed space may be formed between the first housing 10 and the second housing 20.

Correspondingly, when the second housing 20 includes the second flange 21 and the second reinforcing part 211 is formed on the second flange 21, the welding seam 30 does not overlap with at least part of the second reinforcing part 211.

In an embodiment, the welding seam 30 and the first reinforcing part 111 are spaced apart. Cutting is performed between the welding seam 30 and the first reinforcing part 111 to remove the first reinforcing part 111. The first reinforcing part 111 needs to be avoided when welding the first flange 11, so that the first reinforcing part 111 may be completely cut off when subsequently cutting off a part of the first flange 11, and a part of the welding seam 30 will not be cut off.

Correspondingly, when the second housing 20 includes the second flange 21 and the second reinforcing part 211 is formed on the second flange 21, the second reinforcing part 211 needs to be avoided when welding the second flange 21, so that the second reinforcing part 211 may be completely cut off when subsequently cutting off a part of the second flange 21, and a part of the welding seam 30 will not be cut off.

In an embodiment, the first flange 11 retains 0.1 mm to 5 mm after cutting, which not only ensures the reliability of welding, but also does not increase the area of the battery too much.

Correspondingly, when the second housing 20 includes the second flange 21, the second flange 21 retains 0.1 mm to 5 mm after cutting, and outer circumferential edges of the first flange 11 and the second flange 21 may be completely aligned. That is, after welding and connecting the first housing 10 and the second housing 20 through the first flange 11 and the second flange 21, a part of the first flange 11 and the second flange 21 is cut off, so that a reserved length of the first flange 11 and the second flange 21 is basically 0.1 mm to 5 mm. The reserved length of the first flange 11 and the second flange 21 may be consistent or may be, of course, inconsistent.

It should be noted that for welding and connecting the first housing 10 and the second housing 20 through the first flange 11 and the second flange 21, it is emphasized that the first housing 10 and the second housing 20 may be welded and connected mainly through the first flange 11 and the second flange 21. It is not excluded that the first main body part 12 and the second main body part 22 have a welding relationship at the same time. In an embodiment, at least one of the first housing 10 and the second housing 20 is formed with the accommodating cavity 40 for accommodating components such as a cell.

The materials of the first housing 10 and the second housing 20 may be stainless steel or aluminum, which has good corrosion resistance and sufficient strength.

The thickness of the first housing 10 is consistent, which not only has strong structural stability, but also facilitates processing. The thickness of the second housing 20 is consistent. The thickness of the first housing 10 may be equal to the thickness of the second housing 20.

Optionally, the first housing 10 and the second housing 20 may be both formed with the accommodating cavities 40. After docking the first housing 10 and the second housing 20, the cell is located in a cavity formed by the two accommodating cavities 40. The depths of the accommodating cavities 40 of the first housing 10 and the second housing 20 may be the same or different, which is not limited here.

Optionally, the first housing 10 is a plate. The second housing 20 is formed with the accommodating cavity 40. The cell is located in the accommodating cavity 40. The configuration of the plate may facilitate subsequent connection and is less difficult to process.

In an embodiment, the accommodating cavity 40 is obtained through stamping a flat plate 1, that is, the accommodating cavity 40 is stamped to be formed through selecting the flat plate 1 and a stamping process. During the specific process of stamping, a supporting platform with a groove may be selected, so that the accommodating cavity 40 may be formed through stamping, that is, the first housing 10 or the second housing 20 is formed. A part of the flat plate 1 without stamping forms a flange.

Optionally, the first housing 10 is formed with the accommodating cavity 40. The first reinforcing part 111 is formed before stamping the flat plate 1, that is, the first reinforcing part 111 may be formed on the flat plate 1 first, and then the first housing 10 is stamped to be formed through a stamping process. At this time, a segment located on a plane where the opening of the accommodating cavity 40 is at is the first flange 11 of the first housing 10.

Optionally, the first housing 10 is formed with the accommodating cavity 40. The first reinforcing part 111 is formed after stamping the flat plate 1, that is, the first housing 10 may be stamped to be formed through the flat plate 1 first. At this time, a segment located on the plane where the opening of the accommodating cavity 40 is at is the first flange 11 of the first housing 10. Then, the first reinforcing part 111 is formed on the first flange 11.

Correspondingly, the second housing 20 is formed with the accommodating cavity 40. The second reinforcing part 211 is formed before stamping the flat plate 1, that is, the second reinforcing part 211 may be formed on the flat plate 1 first, and then the second housing 20 is stamped to be formed through a stamping process. At this time, a segment located on the plane where the opening of the accommodating cavity 40 is at is the second flange 21 of the second housing 20.

Alternatively, the second housing 20 is formed with the accommodating cavity 40. The second reinforcing part 211 is formed after stamping the flat plate 1, that is, the second housing 20 may be stamped to be formed through the flat plate 1 first. At this time, a segment located on the plane where the opening of the accommodating cavity 40 is at is the second flange 21 of the second housing 20. Then, the second reinforcing part 211 is formed on the second flange 21.

Optionally, the accommodating cavity 40 and the first reinforcing part 111 on the first housing 10 are obtained through synchronously stamping the flat plate 1, that is, the flat plate 1 may be simultaneously stamped through two different stamping heads, thereby forming the first housing 10 with the first reinforcing part 111. At this time, the first reinforcing part 111 is a first protrusion, that is, a groove is formed on the first housing 10.

Correspondingly, the accommodating cavity 40 and the second reinforcing part 211 on the second housing 20 are obtained through synchronously stamping the plate 1, that is, the plate 1 may be simultaneously stamped through two different stamping heads, thereby forming the second housing 20 with the second reinforcing part 211. At this time, the second reinforcing part 211 is a second protrusion.

Figure 3:
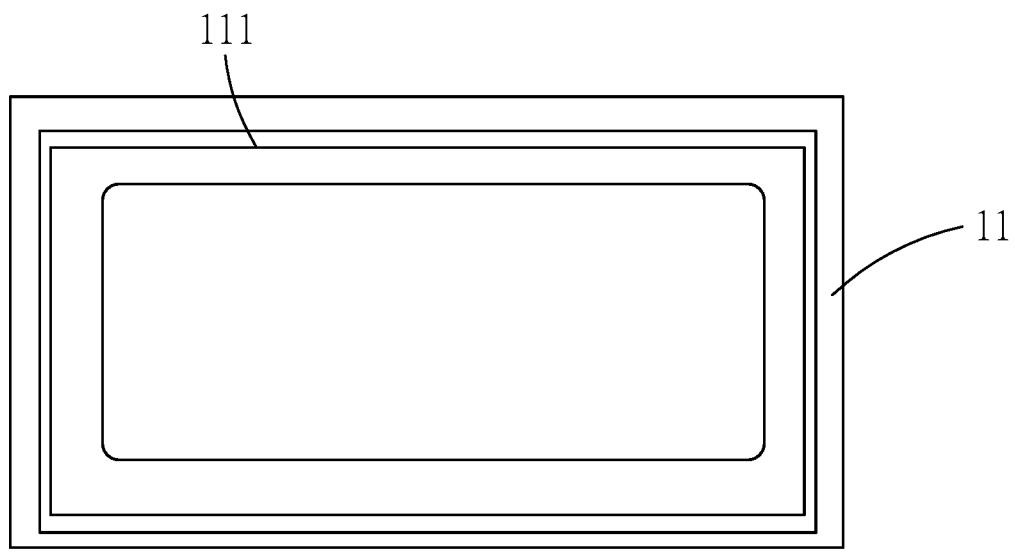
FIG. 3 is a structural schematic view of a first reinforcing part of a battery manufacturing method according to a first exemplary embodiment.

In an embodiment, the first housing 10 further includes the first main body part 12. The first flange 11 is disposed around the outer circumferential edge of the first main body part 12. The first reinforcing part 111 is disposed on the first flange 11 around the first main body part 12, that is, the first reinforcing part 111 forms a circumferentially closed structure, thereby implementing the overall reinforcement of the first flange 11, as shown in FIG. 3. The first main body part 12 includes the bottom wall and the side wall. The opening is an opening of the first main body part 12. The first reinforcing part 111 is disposed on the first flange 11 around the first main body part 12, that is, the first reinforcing part 111 is disposed on the first flange 11 around the opening.

Figure 4:
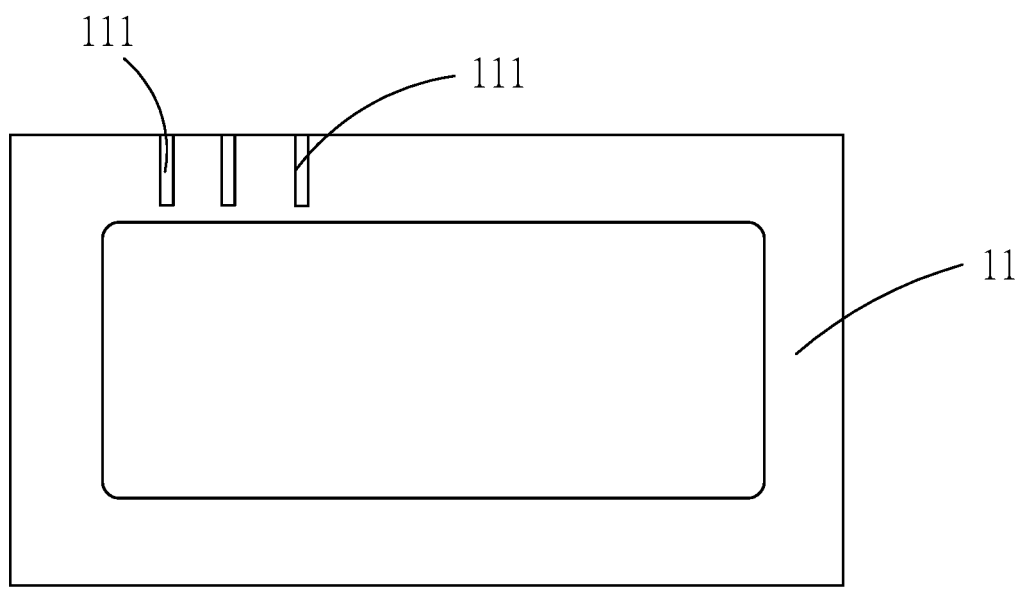
FIG. 4 is a structural schematic view of a first reinforcing part of a battery manufacturing method according to a second exemplary embodiment.

Optionally, as shown in FIG. 4, the first reinforcing part 111 is disposed in a length direction of the first flange 11, and an extension direction of the first reinforcing part 111 is parallel to a width direction of the first flange 11, that is, the first reinforcing part 111 is disposed on a segment with a longer length of the first flange 11, and the extension direction of the first reinforcing part 111 is perpendicular to the length direction of the first flange 11 and is parallel to the width direction of the first flange 11. There may be at least two first reinforcing parts 111. The at least two first reinforcing parts 111 are spaced apart.

Figure 5:
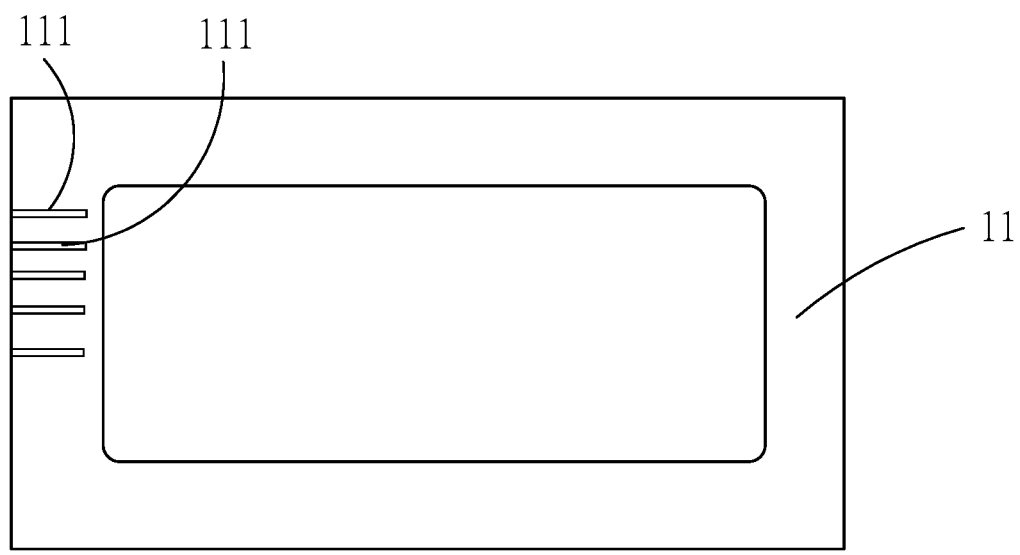
FIG. 5 is a structural schematic view of a first reinforcing part of a battery manufacturing method according to a third exemplary embodiment.

Optionally, as shown in FIG. 5, the first reinforcing part 111 is disposed in the width direction of the first flange 11, and the extension direction of the first reinforcing part 111 is parallel to the length direction of the first flange 11, that is, the first reinforcing part 111 is disposed on a segment with a shorter length of the first flange 11, and the extension direction of the first reinforcing part 111 is parallel to the length direction of the first flange 11 and is perpendicular to the width direction of the first flange 11. There may be at least two first reinforcing parts 111. The at least two first reinforcing parts 111 are spaced apart.

Optionally, the width direction of the first flange 11 and the length direction of the first flange 11 may be both disposed with the first reinforcing parts 111, that is, the first reinforcing part 111 is disposed in the length direction of the first flange 11, and the extension direction of the first reinforcing part 111 is parallel to the width direction of the first flange 11; and the first reinforcing part 111 is disposed in the width direction of the first flange 11, and the extension direction of the first reinforcing part 111 is parallel to the length direction of the first flange 11.

Optionally, the first reinforcing part 111 is disposed in the length direction of the first flange 11, and the extension direction of the first reinforcing part 111 is parallel to the length direction of the first flange 11, so as to avoid deformation of the first flange 11. Further, the first flanges 11 in the two opposite length directions are both disposed with the first reinforcing parts 111.

Optionally, the first reinforcing part 111 is disposed in the width direction of the first flange 11, and the extension direction of the first reinforcing part 111 is parallel to the width direction of the first flange 11. Further, the first flanges 11 in the two opposite width directions are both disposed with the first reinforcing parts 111.

Correspondingly, the second housing 20 further includes the second main body part 22. The second flange 21 is disposed around the outer circumferential edge of the second main body part 22. For the configuration of the second reinforcing part 211 on the second flange 21, reference may be made to the above embodiment, which will not be repeated here.

It should be noted that, regardless of whether the first reinforcing part 111 is disposed in the width direction or the length direction of the first flange 11, the first reinforcing part 111 will not span across the first flange 11, so that the first reinforcing part 111 may be completely cut off when cutting off a part of the first flange 11. Of course, in some embodiments, it is not excluded that the first reinforcing part 111 spans across the first flange 11, that is, a part of the first reinforcing part 111 may be reserved when cutting off the first flange 11. The configuration of the second reinforcing part 211 on the second flange 21 is also similar.

Figure 2:
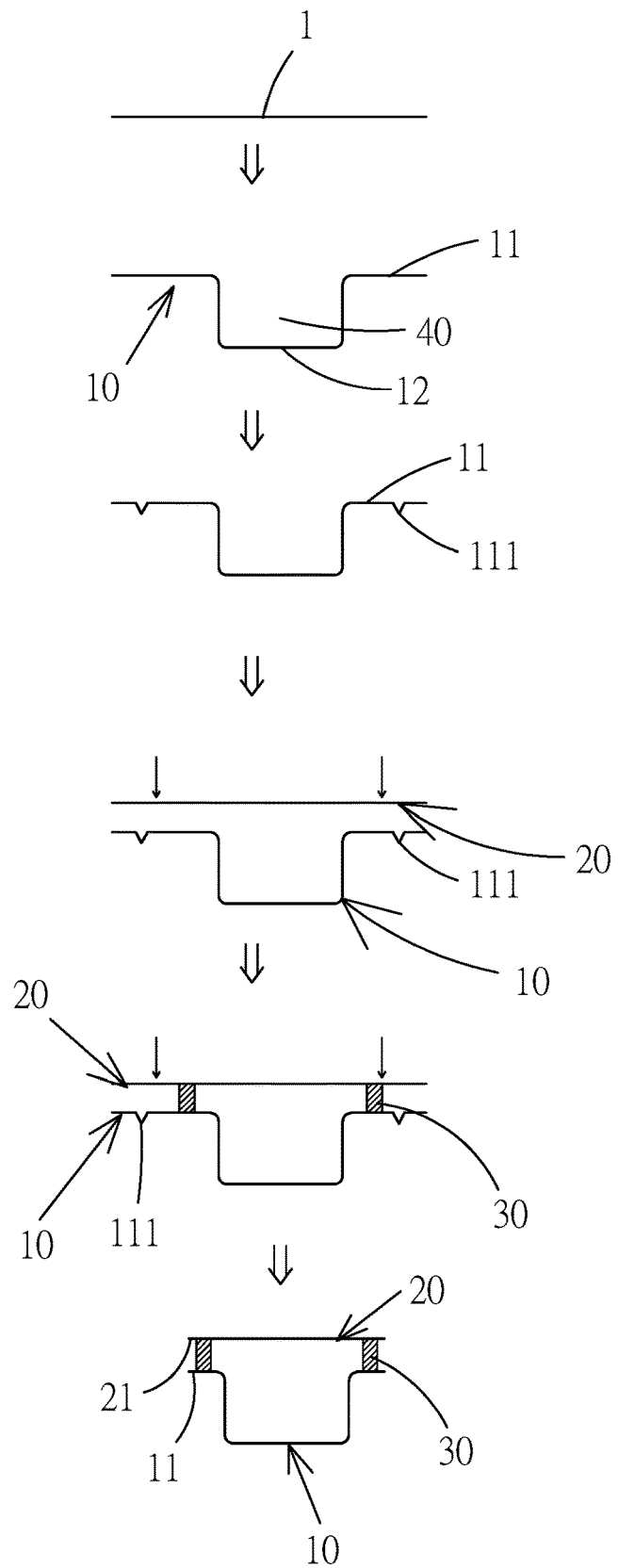
FIG. 2 is a schematic view of a structural flow of a battery manufacturing method according to an exemplary embodiment.

In an embodiment, as shown in FIG. 2, the flat plate 1 is provided. The first housing 10 is formed through stamping. The first reinforcing part 111 is formed on the first flange 11 of the first housing 10. The second housing 20 is formed. The second housing 20 may be a plate. The second reinforcing part 211 is formed on the second housing 20, and the first housing 10 and the second housing 20 are welded to form the welding seam 30. Finally, a part of the first flange 11 and the second flange 21 is cut off.

In an embodiment, the flat plate 1 is provided. The second housing 20 is formed through stamping. The second reinforcing part 211 is formed on the second flange 21 of the second housing 20. The first housing 10 is formed. The first housing 10 may be a plate. The first reinforcing part 111 is formed on the first housing 10, and the first housing 10 and the second housing 20 are welded to form the welding seam 30. Finally, a part of the first flange 11 and the second flange 21 is cut off.

In an embodiment, the first reinforcing part 111 is the first protrusion, and the first protrusion protrudes toward one side of the first flange 11 away from the second housing 20, so as to avoid contact between the first reinforcing part 111 and the second housing 20 to ensure the subsequent stable welding of the first housing 10 and the second housing 20.

Figure 6:
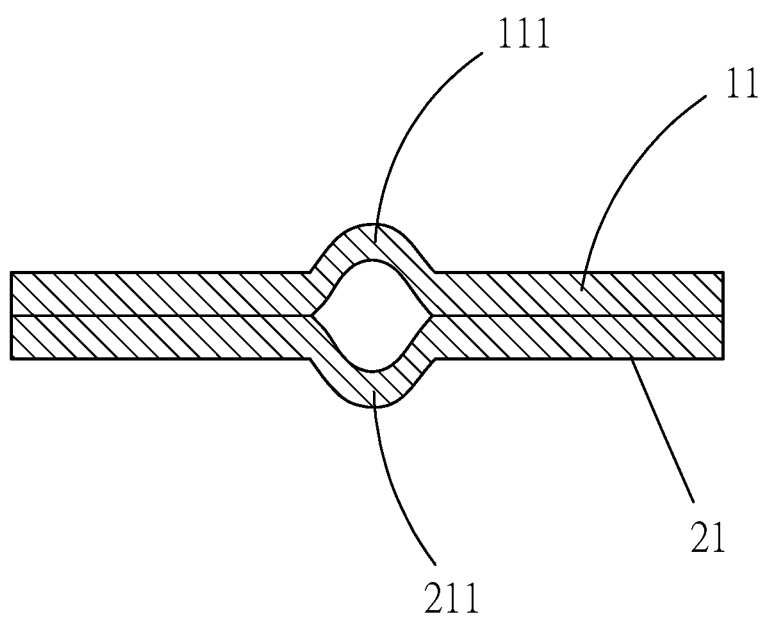
FIG. 6 is a structural schematic view of cooperation between a first flange and a second flange of a battery manufacturing method according to an exemplary embodiment.

In an embodiment, the second housing 20 includes the second flange 21. The second reinforcing part 211 is formed on the second flange 21. The second reinforcing part 211 is the second protrusion, and the second protrusion protrudes toward one side of the second housing 20 away from the first housing 10; and the first reinforcing part 111 is the first protrusion, and the first protrusion protrudes toward one side of the first flange 11 away from the second housing 20, that is, the first protrusion and the second protrusion protrude away from each other, so that there will be no contact interference between the two and corresponding components, specifically as shown in FIG. 6.

Figure 7:
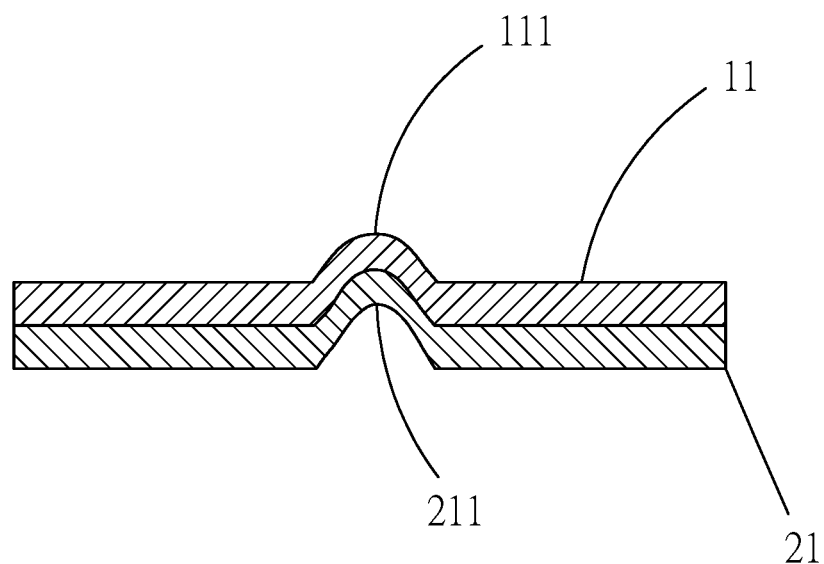
FIG. 7 is a structural schematic view of cooperation between a first flange and a second flange of a battery manufacturing method according to another exemplary embodiment.

Optionally, as shown in FIG. 7, the second protrusion protrudes toward one side of the second housing 20 close to the first housing 10, and the first reinforcing part 111 is the first protrusion, and the first protrusion protrudes toward one side of the first flange 11 away from the second housing 20, so that the second protrusion may be inserted into a groove formed by the first protrusion, that is, the first protrusion and the second protrusion may also implement the positioning of the first housing 10 and the second housing 20 on the basis of serving the function of reinforcement. The configuration of a special positioning structure is not necessary.

It should be noted that the first reinforcing part 111 and the second reinforcing part 211 may be reinforcing ribs. The reinforcing ribs may be structures additionally disposed on the first housing 10 and the second housing 20 or the reinforcing ribs may be protrusions formed through stamping the first housing 10 and the second housing 20, so the reinforcing ribs constitute the function of reinforcement. For example, the first protrusion protrudes toward one side of the first flange 11 away from the second housing 20 to form a groove. The groove may be configured to accommodate the second protrusion. The reinforcing ribs are disposed to prevent the overall housing from larger deformation, provide a specific amount of rigidity for the housing, and ensure the flatness of the housing to facilitate the subsequent welding of the first housing 10 and the second housing 20.

In an embodiment, welding the first housing 10 and the second housing 20 includes: welding the first flange 11 and the second flange 21, that is, the fixed connection between the first housing 10 and the second housing 20 is implemented through the first flange 11 and the second flange 21.

In an embodiment, before welding the first flange 11 and the second flange 21, a cell 50 is placed between the first housing 10 and the second housing 20 to seal the cell 50 after welding the first flange 11 and the second flange 21, so that the fixing of the position of the cell 50 is also implemented.

In an embodiment, the cell 50 is a laminated cell, which is not only convenient for grouping, but may also be processed to obtain a longer battery. The cell 50 has a first pole piece, a second pole piece electrically opposite to the first pole piece, and a diaphragm piece disposed between the first pole piece and the second pole piece that are stacked on top of one another, so that multiple pairs of the first pole piece and the second pole piece are stacked to form the laminated cell.

Optionally, the battery may be a wound battery, that is, the first pole piece, the second pole piece electrically opposite to the first pole piece, and the diaphragm piece disposed between the first pole piece and the second pole piece are wound to obtain the wound battery.

Figure 8:
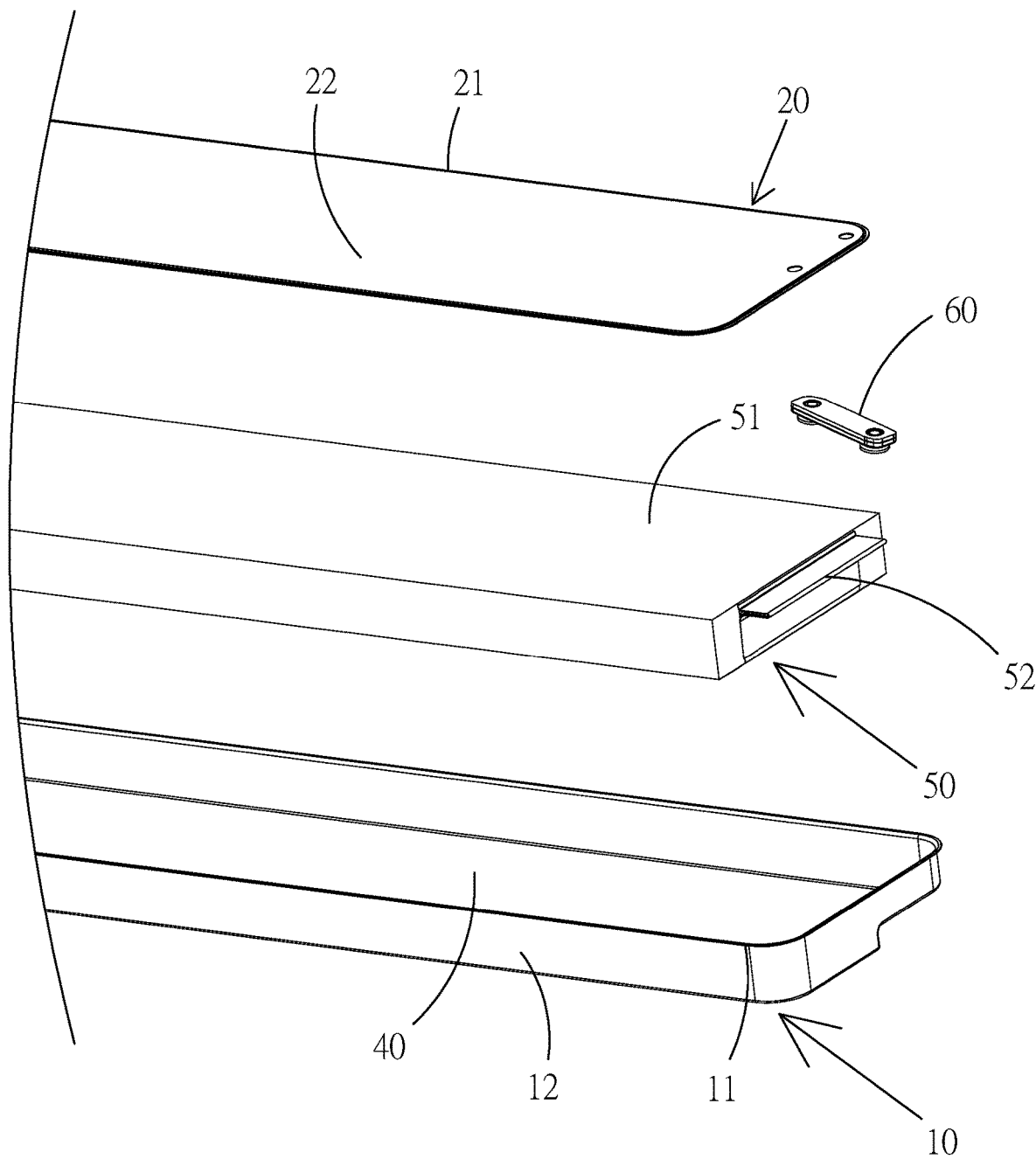
FIG. 8 is a partially exploded structural schematic view of a battery according to an exemplary embodiment.

In an embodiment, as shown in FIG. 8, the cell 50 includes a cell main body 51 and a tab 52. The tab 52 extends from a length direction of the cell main body 51.

A pole assembly 60 is installed on the first housing 10 or the second housing 20. Before welding the first housing 10 and the second housing 20, the tab 52 is connected with the pole assembly 60. The tab 52 and the pole assembly 60 may be directly connected, that is, the tab 52 and the pole assembly 60 may be directly welded, or the tab 52 and the pole assembly 60 may be connected through a metal adapting piece. The specific connection may be welding, but manners such as the use of a riveted joint are not excluded and are not limited here.

It should be noted that the cell main body 51 includes more than two pole pieces. The tab 52 includes more than two single tabs. The single tabs respectively extend from the corresponding pole pieces. The width of the single tab is less than the width of the pole piece. Multiple single tabs are stacked to form the tab 52, which is connected with the pole assembly 60. The tab 52 may be welded to the pole assembly 60. The single tab is made of metal foil with good electrical and thermal conductivity, such as aluminum, copper, or nickel.

In some embodiments, there are two pole assemblies 60. The two pole assemblies 60 are respectively a positive pole assembly and a negative pole assembly. There are also two tabs 52. The two tabs 52 are respectively a positive tab and a negative tab. The positive pole assembly is connected with the positive tab. The negative pole assembly is connected with the negative tab.

It should be noted that any one of laser welding, ultrasonic welding, and resistance welding may be adopted for the welding.

An embodiment of the disclosure also provides a battery, which includes the battery obtained by the battery manufacturing method.

The battery according to an embodiment of the disclosure includes a first housing 10 and a second housing 20. A first reinforcing part 111 is formed on a first flange 11 of the first housing 10, thereby avoiding the issue of deformation of the first housing 10 when welding the first housing 10 and the second housing 20, so as to improve a battery structure.

Optionally, the battery has an approximate rectangular structure, that is, omitting processing and manufacturing errors, the battery may have a rectangular structure.

In an embodiment, the length of the battery is a, where 400 mm≤a≤2500 mm, the width of the battery is b, and the height of the battery is c, where 2b≤a≤50b and/or 0.5c≤b≤20c.

Further, 50 mm≤b≤200 mm and 10 mm≤c≤100 mm.

Further, 4b≤a≤25b and/or 2c≤b≤10c.

For the battery in the above embodiment, in the case where sufficient energy density is ensured, the ratio of the length to the width of the battery is larger. Further, the ratio of the width to the height of the battery is larger.

In an embodiment, the length of the battery is a, the width of the battery is b, and the height of the battery is c, where 4b≤a≤7b and/or 3c≤b≤7c.

In an embodiment, the length of the battery is a and the width of the battery is b, where 4b≤a≤7b, that is, the ratio of the length to the width of the battery in the embodiment is larger, so as to increase the energy density of the battery and facilitate subsequently forming a battery module.

In an embodiment, the height of the battery is c, where 3c≤b≤7c, and the ratio of the width to the height of the battery is larger, which also facilitates formation in the case where sufficient energy density is ensured.

Optionally, the length of the battery may be 500 mm to 1500 mm, the width of the battery may be 80 mm to 150 mm, and the height of the battery may be 15 mm to 25 mm.

It should be noted that the length of the battery is the size of the battery in a length direction, the width of the battery is the size of the battery in a width direction, and the height of the battery is the size of the battery in a height direction, that is, the thickness of the battery. The battery has the length direction and the width direction, and the length direction and the width direction are both linear directions. The length direction may be a longer extension direction of the battery and the width direction may be a shorter extension direction of the battery. The height direction may be a thickness direction of the battery.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery manufacturing method, comprising:
providing a first housing, wherein the first housing forms an accommodating cavity, the first housing comprises a bottom wall and a side wall, the side wall extends upward from the bottom wall, the side wall encloses to form an opening, the side wall extends outward from the opening to form a first flange, and at least one first reinforcing part is formed on the first flange;
providing a second housing, wherein the second housing comprises an intermediate part and a second flange, the intermediate part covers the opening, and the second flange is in contact with the first flange;
welding the first flange and the second flange; and
cutting at least part of the first flange after welding the first flange and the second flange to remove at least part of the at least one first reinforcing part,
wherein the first flange and the second flange are welded to form a welding seam located between the first flange and the second flange, the welding seam and the at least one first reinforcing part are spaced apart, a projection of the welding seam projected to the first flange is not overlapped with a projection of each of the at least one first reinforcing part projected to the first flange, and cutting is performed between the welding seam and the at least one first reinforcing part to remove the at least one first reinforcing part.

2. The battery manufacturing method according to claim 1, wherein the first flange retains 0.1 mm to 5 mm after cutting.

3. The battery manufacturing method according to claim 2, wherein the at least one first reinforcing part is a first protrusion, and the first protrusion protrudes toward one side of the first flange away from the second housing.

4. The battery manufacturing method according to claim 3, wherein a second reinforcing part is formed on the second flange; and the second reinforcing part is a second protrusion, and the second protrusion protrudes toward one side of the second housing away from the first housing; or the first protrusion protrudes toward one side of the first flange away from the second housing to form a groove, and the second protrusion protrudes toward one side of the second housing close to the first housing to be inserted into the groove.

5. The battery manufacturing method according to claim 1, wherein the first housing is formed with an accommodating cavity, and the accommodating cavity is obtained through stamping a flat plate; or the accommodating cavity and the at least one first reinforcing part are obtained through synchronously stamping a flat plate.

6. The battery manufacturing method according to claim 5, wherein the at least one first reinforcing part is a first protrusion, and the first protrusion protrudes toward one side of the first flange away from the second housing.

7. The battery manufacturing method according to claim 6, wherein a second reinforcing part is formed on the second flange; and the second reinforcing part is a second protrusion, and the second protrusion protrudes toward one side of the second housing away from the first housing; or the first protrusion protrudes toward one side of the first flange away from the second housing to form a groove, and the second protrusion protrudes toward one side of the second housing close to the first housing to be inserted into the groove.

8. The battery manufacturing method according to claim 1, wherein the at least one first reinforcing part is disposed on the first flange around the opening; the at least one first reinforcing part is disposed in a length direction of the first flange, and an extension direction of the at least one first reinforcing part is parallel to a width direction of the first flange; the at least one first reinforcing part is disposed in a width direction of the first flange, and an extension direction of the at least one first reinforcing part is parallel to a length direction of the first flange; the at least one first reinforcing part is disposed in a length direction of the first flange, and an extension direction of the at least one first reinforcing part is parallel to the length direction of the first flange; or the at least one first reinforcing part is disposed in a width direction of the first flange, and an extension direction of the at least one first reinforcing part is parallel to the width direction of the first flange.

9. The battery manufacturing method according to claim 8, wherein the at least one first reinforcing part is a first protrusion, and the first protrusion protrudes toward one side of the first flange away from the second housing.

10. The battery manufacturing method according to claim 9, wherein a second reinforcing part is formed on the second flange; and the second reinforcing part is a second protrusion, and the second protrusion protrudes toward one side of the second housing away from the first housing; or the first protrusion protrudes toward one side of the first flange away from the second housing to form a groove, and the second protrusion protrudes toward one side of the second housing close to the first housing to be inserted into the groove.

11. The battery manufacturing method according to claim 1, wherein the at least one first reinforcing part is a first protrusion, and the first protrusion protrudes toward one side of the first flange away from the second housing.

12. The battery manufacturing method according to claim 11, wherein a second reinforcing part is formed on the second flange; and the second reinforcing part is a second protrusion, and the second protrusion protrudes toward one side of the second housing away from the first housing; or the first protrusion protrudes toward one side of the first flange away from the second housing to form a groove, and the second protrusion protrudes toward one side of the second housing close to the first housing to be inserted into the groove.

13. The battery manufacturing method according to claim 1, wherein before welding the first flange and the second flange, a cell is placed between the first housing and the second housing to seal the cell after welding the first flange and the second flange.

14. A battery, comprising a battery obtained by the battery manufacturing method according to claim 1.

15. The battery according to claim 14, wherein a length of the battery is a, a width of the battery is b, and a height of the battery is c, where $2b \leq a \leq 50b$ and/or $0.5c \leq b \leq 20c$; and $400 \text{ mm} \leq a \leq 2500 \text{ mm}$.

* * * * *